3,212,920
DELUSTERING OF GLOSSY SURFACES BY THE USE OF A NON-PARTICLE CONTAINING COATING COMPOSITION

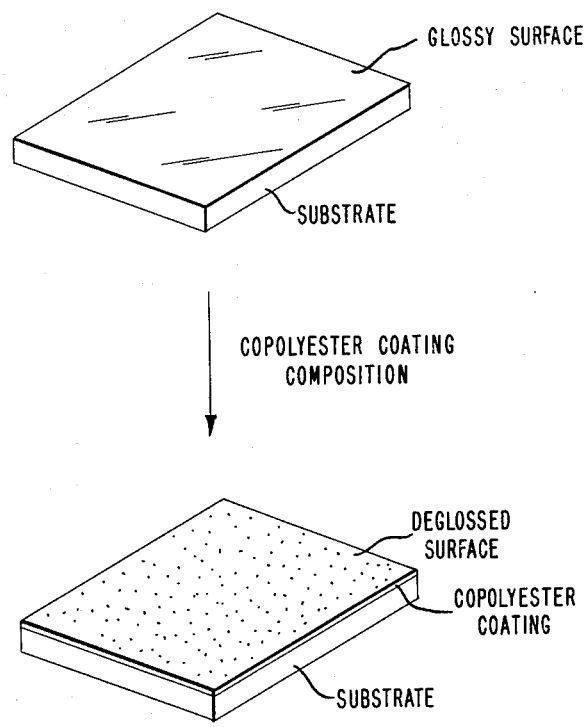

Aurelius Franklin Chapman, Wilmington, Del., assignor to E. I. du Pont de Nemours and Company, Wilmington, Del., a corporation of Delaware
Filed Sept. 20, 1960, Ser. No. 57,118
8 Claims. (Cl. 117—76)

This invention relates to delustering of glossy surfaces. More particularly, it relates to the delustering of polyethylene terephthalate films.

Oriented polyethylene terephthalate film has the impact resistance, clarity and inertness which make it potentially attractive as an implosion barrier for covering television picture tubes. A process for accomplishing this is described in Harrison, U.S. Patent 2,828,799. Manufacturers, however, want a material which has the desirable physical properties of oriented polyethylene terephthalate film yet possesses a non-reflecting surface. This must be accomplished with no loss of picture resolution.

An object of this invention is to provide a method for delustering of glossy surfaces. Another object is to provide a method for delustering the surface of polyethylene terephthalate film. Yet another object is to provide such a method wherein said delustered film is suitable as an envelope for television picture tubes. A further object is to provide such a method that is simple, effective and subject to good quality control. Other objects will appear hereinafter.

These and other objects are accomplished by the instant invention which comprises a method for delustering a glossy surface which comprises coating said surface with a delustering composition consisting essentially of from about 10 to 20% by weight of a copolyester and from about 80 to 90% by weight of a solvent for said copolyester and a non-solvent for said copolyester and drying said coated surface; wherein, the ratio of solvent to non-solvent is such that the copolyester remains in solution in the solvent, the amount of non-solvent being at least about 8% by weight of the total weight of solvent plus non-solvent, and wherein said non-solvent has a higher boiling point than said solvent.

The attached drawing illustrates a glossy surface before and after coating the glossy surface with a copolyester coating composition.

The glossy surface which is delustered is preferably a polyethylene terephthalate film; however, other glossy surfaces can be delustered according to this invention, e.g., regenerated cellulose film, cellulose acetate film, polyethylene film, plate glass, polystyrene film, polyvinyl chloride film, polyvinyl fluoride film, polypropylene film, etc.

The copolyester in the coating composition is preferably a polyesterification product of ethylene glycol with one or more of the dibasic acids: terephthalic, isophthalic, sebacic and adipic acids. Particularly preferred are copolyesters of ethylene glycol with: (a) 40 mol percent terephthalic acid, 40 mol percent isophthalic acid, 10 mol percent sebacic acid and 10 mol percent adipic acid, (b) 50 mol percent sebacic acid, 33 mol percent terephthalic acid and 17 mol percent isophthalic acid, and (c) 55 mol percent terephthalic acid and 45 mol percent sebacic acid. It is, of course, obvious that the above copolyesters can be prepared from the corresponding esters of the above acids by ester interchange. Various solvent/non-solvent mixtures can be used. It is important, however, to carefully select the critical ratio of solvent to non-solvent so as to prevent precipitation of the copolyester from the solvent solution. Particularly preferred solvent/non-solvent mixtures with their critical ratios (by weight) are as follows: (a) from about 88 to 92% 1,1,2-trichloroethane and from about 8 to 12% kerosene, (b) from about 57 to 64% 1,1,2-trichloroethane and from about 36 to 43% Cellosolve, (c) from about 61 to about 69% of an equal mixture of methyl ethyl ketone and dioxane and from about 31 to 39% isobutyl acetate, (d) about 56% N-methyl morpholine and about 44% Cellosolve, and (e) about 90% tetrahydrofurane and about 10% water. ("Cellosolve" is the common name for 2-ethoxyethanol.) The amount of non-solvent is at least about 8% by weight of the total weight of solvent plus non-solvent. Other solvents, such as cyclohexanone, trichloroethylene, etc., and non-solvents, such as, n-butyl alcohol, n-butyl acetate, amyl acetate, etc., for the copolyester can be used and are known to those skilled in the art.

When delustered polyethylene terephthalate film is to be used as an implosion barrier for covering television picture tubes, an isocyanate is incorporated in the delustering coating composition or is applied over the dried, delustered surface to harden the delustering coating, thus preventing the delustering coating from becoming soft and flowing into a smooth, transparent, glossy coating having no delustering power, when the delustered film is heated prior to being applied over a television picture tube, as described in Harrison U.S. Patent 2,828,799.

Suitable isocyanates include diphenylmethane-4,4'-diisocyanate, hexamethylene diisocyanate, 2,4 tolylene diisocyanate dimer, 3,3'-dimethyl diphenyl methane-4,4'-diisocyanate, dianisidine diisocyanate, and trimethylol propane toluene diisocyanate reaction product. Where the isocyanate would react with one of the solvents or non-solvents (e.g., Cellosolve, water, etc.), it must be applied after the delustering composition is applied and dried.

An isocyanate applied to the glossy surface prior to application of the delustering coating composition serves to anchor the coating more firmly to the base film. The application of an isocyanate to the coating after it is applied makes the latter more scratch resistant and thus more suitable for use on television picture tubes.

When the film delustered according to this invention is a polyethylene terephthalate film and is used as an envelope for television picture tubes, a laminated polyethylene terephthalate film is preferred. As in laminated safety glass, the adhesive between the laminate helps to prevent particles of glass from cutting through the film barrier in the event of an implosion or explosion. Also, a thinner laminated film is equivalent in barrier properties to a much thicker single thickness film, and, as film thickness increases, it becomes more difficult to form the film around the picture tube without any voids occurring between the glass surface and the film surface.

Tinting of the laminated films has been found to be desirable by the various tube manufacturers, each of which requires a different shade; usually in the bluish black range. Experience has shown that the most satisfactory way to tint a polyethylene terephthalate film laminate is to color the laminating adhesive. There is nothing critical about the particular combination of pigments used and the particular laminating adhesive used is likewise not critical. Any adhesive which adheres well to polyethylene terephthalate film may be used.

Solids content of the delustering composition does not appear to be a critical factor. Baths varying from 5 to 25% solids content have been successfully used. Solutions may be applied by any of the well-known coating techniques, such as, direct roll, reverse roll, gravure roll, etc. Generally a knurl-type roll is preferred.

The invention will now be illustrated by the following examples.

Example I

Two layers of oriented polyethylene terephthalate film (one layer 1 mil thick and one layer 5 mils thick) were laminated together using a tinted copolyester adhesive of polyethylene terephthalate-sebacate (which is made by reacting ethylene glycol with 55 mol percent dimethyl terephthalate and 45 mol percent dimethyl sebacate), containing blue pigment, red pigment and lamp black in the following amounts:

| | Parts by weight |
|---|---|
| Copolyester | 6.8 |
| Blue pigment | 1.0 |
| Red pigment | 1.0 |
| Lamp black | 3.0 |
| 1,1,2-trichloroethane solvent | 33.2 |

The above tinted adhesive was applied to one surface of the 1 mil polyethylene terephthalate film using an 84 line ruling mill knurl. The adhesive coated film was then passed through a dryer at approximately 95° C. to remove the 1,1,2-trichloroethane solvent and then immediately laminated to the 5 mil polyethylene terephthalate film by passing the two superimposed films between a heated metal roll (approximately 140° C.) and a rubber nip roll.

The exposed surface of the 1 mil layer was then given a very light coating with a composition comprising 1% diphenyl methane-4,4'-diisocyanate dissolved in a 98/2 solvent combination of toluene and chlorobenzene, at the rate of approximately 0.04 lb. of the isocyanate per 3000 square feet of surface, using a knurled-type gravure applicator roll. The coated laminate was then passed through a dryer at approximately 200° F. to remove the solvents. This isocyanate helped to anchor the delustering coating.

The dried, treated surface was then coated with a composition comprising 16% of a polyethylene terephthalate-isophthalate-sebacate-adipate copolyester which is made by reacting ethylene glycol with 40 mol percent of dimethyl terephthalate, 40 mol percent of dimethyl isophthalate, 10 mol percent of dimethyl sebacate and 10 mol percent of dimethyl adipate. The remaining 84% of this coating composition consisted of 65% of an equal mixture of methyl ethyl ketone and dioxane as the copolyester solvent, and 35% isobutyl acetate as the non-solvent for the copolyester. To this composition was added 10% (based on the weight of the copolyester) of a trimethylol propane toluene diisocyanate reaction product. The coating composition was applied to the treated surface of the polyethylene terephthalate film at a rate of approximately 0.45 gram of solids per square foot, and then dried approximately 180° F.

The treated surface was then given a final light coating with a composition comprising 1% diphenyl methane-4,4'-diisocyanate dissolved in methyl isobutyl ketone (approximately 0.04 lb. of the isocyanate per 3000 square feet of surface) and dried at approximately 190° F. The correct solvent for this isocyanate is important because toluene or methyl ethyl ketone would attack the delustered copolymer coating and make it completely smooth, transparent and glossy. An excellent, hardened, delustered surface on the laminate resulted.

Example II

A coating composition containing 17.5% of the polyethylene terephthalate-isophthalate-sebacate-adipate copolyester described in Example I and 82.5% of a solvent/non-solvent combination containing 56% N-methyl morpholine (solvent) and 44% cellosolve (non-solvent) was prepared. (All percentages are on a weight basis.)

The above coating composition was then coated on one surface of oriented polyethylene terephthalate film lamination 6 mils thick at the rate of 0.4 gram of solids per square foot, using an 80 line ruling mill knurl. Excess solvent was removed by a hot air blast (80° C.) and the coated film was dried at 135° C. for approximately 15 seconds. A delustered product having good picture tube resolution and low surface reflectance was obtained. To insure heat resistance during forming around a television picture tube, the coated surface was then treated with a 1% solution of diphenyl methane-4,4'-diisocyanate dissolved in a solvent combination of 99/1 diisobutyl ketone/chlorobenzene. An excellent, hardened, delustered laminated film was obtained.

Example III

A coating composition containing 15% of the copolyester described in Example I and 85% of a solvent/non-solvent combination containing 60% of 1,1,2-trichloroethane (solvent) and 40% Cellosolve (non-solvent) was prepared. All percentages are on a weight basis. The above coating composition was applied at the rate of 0.5 gram of solids per square foot on one surface of polyethylene terephthalate film lamination 4 mils thick using a 140 line "quad" knurl. After excess solvent was removed by hot air (80° C.) the film was dried at 135° C. for 15 seconds. The coated surface was then given a very light coating with a 1% solution of diphenyl methane-4,4'-diisocyanate dissolved in a solvent combination of 99/1 diisobutyl ketone/chlorobenzene. An excellent, hardened, delustered laminated film resulted.

Example IV

A coating composition containing 18% of the copolyester described in Example I and 82% of a solvent/non-solvent combination containing 91.8% of 1,1,2-trichloroethane (solvent) and 8.2% kerosene (non-solvent) was prepared. All percentages are on a weight basis. Ten percent of diphenyl methane-4,4'-diisocyanate, based on the weight of the copolyester, was then added to the coating composition. The composition was coated on one surface of a polyethylene terephthalate film 4 mils thick at the rate of approximately 0.3 gram of solids per square foot, using a 140 "quad" knurl rule. A delustered surface having good resolution and low reflection resulted. The delustering was not adversely affected during forming around a television picture tube.

Example V

A coating composition containing 15% of the copolyester described in Example I and 85% of a solvent/non-solvent combination comprising 90% tetrahydrofurane (solvent) and 10% water (non-solvent) was prepared. This composition was applied on one surface of 7 mil polyethylene terephthalate film lamination at the rate of 0.5 gram of solids per square foot using a reverse roll coating technique. Excess solvent was removed by hot air (80° C.) and the film was dried at 135° C. An excellent delustered coating resulted. To insure heat resistance, the delustered surface was then given a light coating with a 1% solution of diphenyl methane-4,4'-diisocyanate, in 99/1 diisobutyl ketone/chlorobenzene solvent combination and dried.

There is a critical ratio for each solvent/non-solvent pair. When more than the critical amount of non-solvent is used, the delustering bath has a tendency to separate into two phases. When less than the critical amount of non-solvent is used, the copolyester remains dissolved until the end of the drying cycle, thus forming a smooth, glossy, non-delustering coating. In each case, the non-solvent has a higher boiling point than the solvent and evaporates after the solvent, thus giving the rough, delustered effect of the copolyester. An experiment substantially identical to Example IV was run omitting the non-solvent entirely. The coated film was brilliantly clear and no delustering at all was effected.

Curing agents may be added to the coating compositions of the various examples mentioned above to increase solvent resistance and to improve hardness of the delustering coating. Small amounts of alcohol-modified urea formaldehyde or melamine formaldehyde resins or the addition of an isocyanate will accomplish the desired result. Best results are obtained when the combination of isocyanates spelled out in the preferred embodiment is used. The application of an isocyanate to the dried, delustered surface requires a solvent which is a non-solvent for the already-applied copolyester.

There does not appear to be any critical drying temperature range necessary to bond the isocyanate and the copolyester. Heat does speed up the reaction, but samples which were allowed to remain at room temperature for several weeks were completely cured.

Previous to this invention, television manufacturers have had to place an expensive glass implosion window in front of the picture tube and have encountered all sorts of difficulties in trying to eliminate the reflection of room light by two glass surfaces. This invention makes it possible to shape a non-reflecting implosion barrier in absolute overall contact with a television picture tube so that reflecting troubles have been eliminated.

What is claimed is:

1. A method for delustering a glossy surface selected from the group consisting of plate glass, polyethylene terephthalate film, regenerated cellulose film, cellulose acetate film, polyethylene film, polystyrene film, polyvinyl chloride film, polyvinyl fluoride film, polypropylene film and laminates thereof which comprises coating said surface with a delustering composition comprising from about 10 to 20% by weight of a copolyester of ethylene glycol with dibasic acids selected from the group consisting of (a) 40 mol percent terephthalic acid, 40 mol percent isophthalic acid, 10 mol percent sebacic acid and 10 mol percent adipic acid, (b) 50 mol percent sebacic acid, 33 mol percent terephthalic acid and 17 mol percent isophthalic acid, and (c) 55 mol percent terephthalic acid and 45 mol percent sebacic acid and from about 80 to 90% by weight of a solvent for said copolyester and a non-solvent for said copolyester selected from the group consisting of water, kerosene, 2-ethoxyethanol, n-butyl alcohol, isobutyl acetate, n-butyl acetate, and amyl acetate and drying said coated surface; wherein, the ratio of solvent to non-solvent is such that the copolyester remains in solution in the solvent, the amount of non-solvent being at least about 8% by weight of the total weight of solvent plus non-solvent, and wherein said non-solvent has a higher boiling point than said solvent.

2. Method according to claim 1 wherein said delustering composition contains an isocyanate.

3. Method according to claim 1 wherein an isocyanate is applied to said dried, coated surface.

4. Method according to claim 1 wherein an isocyanate is applied to said surface and dried prior to coating with said delustering composition.

5. Method according to claim 1 wherein said copolyester is a polyesterification product of ethylene glycol with about 40% terephthalic acid and about 40% isophthalic acid, about 10% sebacic acid and about 10% adipic acid.

6. Method according to claim 1 wherein said solvent and said non-solvent are selected from the group consisting of the following solvent/non-solvent pairs in the indicated ratios: (a) from about 88 to 92% 1,1,2-trichloroethane and from about 8 to 12% kerosene, (b) from about 57 to 64% 1,1,2-trichloroethane and from about 36 to 43% Cellosolve, (c) from about 61 to about 69% of an equal mixture of methyl ethyl ketone and dioxane and from about 31 to 39% isobutyl acetate, (d) about 56% N-methyl morpholine and about 44% Cellosolve, and (e) about 90% tetrahydrofurane and about 10% water.

7. Method according to claim 2 wherein said isocyanate is selected from the group consisting of diphenyl methane-4,4'-diisocyanate, hexamethylene diisocyanate, 2,4 tolylene diisocyanate dimer, 3,3'-dimethyl diphenyl methane-4,4'-diisocyanate, dianisidine diisocyanate, and trimethylol propane toluene diisocyanate reaction product.

8. A method for delustering a tinted, oriented polyethylene terephthalate laminate surface which comprises: coating said surface with a composition comprising 1% diphenyl methane-4,4'-diisocyanate dissolved in a 98/2 solvent combination of toluene and chlorobenzene; drying said coated surface; coating said dried, isocyanate coated surface with a composition comprising 16% of a polyethylene terephthalate-isophthalate-sebacate-adipate copolyester made by reacting ethylene glycol with 40 mol percent dimethyl terephthalate, 40 mol percent dimethyl isophthalate, 10 mol percent dimethyl sebacate and 10 mol percent dimethyl adipate and 84% consisting of 65% of an equal mixture of methyl ethyl ketone and dioxane and 35% isobutyl acetate, said composition having added to it 10%, based on the weight of the copolyester, of a trimethylol propane toluene diisocyanate reaction product; drying said coated surface; coating said dried, isocyanate and copolyester coated surface with a composition comprising 1% diphenyl methane-4,4'-diisocyanate dissolved in methyl isobutyl ketone and finally drying said coated surface.

References Cited by the Examiner

UNITED STATES PATENTS

| 2,683,100 | 7/54 | Edgar et al. | 117—161 X |
| 2,698,241 | 12/54 | Saner. | |
| 2,993,807 | 7/61 | Abbott et al. | 117—161 |
| 3,022,169 | 2/62 | Hekelmann et al. | 117—144.5 |
| 3,034,920 | 5/62 | Waller et al. | 117—161 X |

FOREIGN PATENTS

| 585,378 | 10/59 | Canada. |
| 822,894 | 11/59 | Great Britain. |

OTHER REFERENCES

Coles et al.: "Optical Lens Coatings," pp. 123–126, 167–172, Modern Plastics, July 1948.

WILLIAM D. MARTIN, *Primary Examiner.*

RICHARD D. NEVIUS, *Examiner.*